(12) United States Patent
McArdle

(10) Patent No.: US 8,082,553 B2
(45) Date of Patent: Dec. 20, 2011

(54) CLIENT MANAGEMENT OF JAVA MANAGEMENT EXTENSIONS (JMX) MBEAN STATE

(75) Inventor: James M. McArdle, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1184 days.

(21) Appl. No.: 11/767,591

(22) Filed: Jun. 25, 2007

(65) Prior Publication Data

US 2008/0320034 A1    Dec. 25, 2008

(51) Int. Cl.
G06F 9/44    (2006.01)
G06F 7/00    (2006.01)

(52) U.S. Cl. ........................................ 719/316; 707/769
(58) Field of Classification Search .................. 719/310, 719/316, 320; 707/769, 781, 999.103
See application file for complete search history.

(56) References Cited

U.S. PATENT DOCUMENTS

| | | | |
|---|---|---|---|
| 6,874,020 B1 * | 3/2005 | Da Palma et al. ............ | 709/223 |
| 7,152,185 B2 * | 12/2006 | Srivastava et al. ............ | 714/24 |
| 7,287,075 B2 * | 10/2007 | Srivastava et al. ............ | 709/224 |
| 7,295,952 B1 * | 11/2007 | Cheng et al. ................. | 702/185 |
| 7,395,458 B2 * | 7/2008 | Shrivastava et al. ........... | 714/47 |
| 7,546,605 B1 * | 6/2009 | Kruger et al. ................ | 719/316 |
| 7,562,341 B2 * | 7/2009 | Kovachka-Dimitrova et al. .............................. | 717/107 |
| 7,577,731 B2 * | 8/2009 | Frey et al. .................... | 709/223 |
| 7,721,283 B2 * | 5/2010 | Kovachka-Dimitrova et al. .............................. | 717/177 |
| 7,729,363 B2 * | 6/2010 | Shenfield et al. ............. | 370/401 |
| 7,735,097 B2 * | 6/2010 | Kovachka-Dimitrova et al. .............................. | 719/328 |
| 2004/0054569 A1 * | 3/2004 | Pombo et al. ..................... | 705/7 |
| 2006/0165105 A1 * | 7/2006 | Shenfield et al. ............. | 370/401 |

* cited by examiner

*Primary Examiner* — Van Nguyen
(74) *Attorney, Agent, or Firm* — Matthew B. Talpis; Gregory K Goshorn; Greg Goshorn, P.C.

(57) ABSTRACT

Provided is a method for maintaining state information on a JAVA® Management Extension (JMX) Mbean programming object and simplifying the procedure for creating and employing the Mbean. Prior to invocation of a JMX Mbean, a JMX properties object is created. When the JMX Mbean is invoked, the properties object is passed to the JMX Mbean-Server interface. The JMX MbeanServer interface returns an updated properties object, containing all the state information for the new Mbean object. Each time the user make a call to JMX host via the Mbean object, the properties object is passed and, if necessary, updated.

20 Claims, 7 Drawing Sheets

```
151   public String runAdminQuery() {
152       Object[] args = new Object[8];
153       String[] sigs = new String[8]
154       args = new Object[7];
155       sigs = new String[7];
156       args[0] = jdbcDriver;
157       sigs[0] = "java.lang.String";
158       args[1] = jdbcType;
159       sigs[1] = "java.lang.String";
160       args[2] = serverName;
161       sigs[2] = "java.lang.String";
162       args[3] = portNumber + "";
163       sigs[3] = "java.lang.String";
164       args[4] = databaseAlias;
155       sigs[4] = "java.lang.String";
166       args[5] = userName;
167       sigs[5] = "java.lang.String";
168       args[6] = userPswd;
169       sigs[6] = "java.lang.String";
170       args[7] = sqlStmt;
171       sigs[7] = "java.lang.String";
172       mbeanMethod = "runAdminQuery";
173       sqlResults = (String) mbsInvoke(mbeanMethod, args, sigs);
174       return sqlResults;
175   }
```

| | |
|---|---|
| 201 | class XYZZY { |
| 202 | Properties p = new Properties(); |
| 203 | ... other methods... |
| 204 | public void makeConnection() { |
| 205 | p.setProperty( "jdbcDriver", jdbcDriver ); |
| 206 | p.setProperty( "jdbcType", jdbcType ); |
| 207 | p.setProperty( "serverName", serverName ); |
| 208 | p.setProperty( "portNumber", portNumber+"" ); |
| 209 | p.setPorperty( "databaseAlias", databaseAlias ); |
| 210 | p.setProperty( "userName", userName ); |
| 211 | p.setProperty( "userPswd", userPswd ); |
| 212 | } |

| | |
|---|---|
| 221 | public String runAdminQuery(String sqlStmt) { |
| 222 | Object args[]=new String[1]; |
| 223 | String sigs[]=new String[1]; |
| 224 | Properties p = new Properties(); |
| 225 | args[0]=p; |
| 226 | sigs[0]="java.util.Properties"; |
| 227 | p.setProperty( "sqlStmt", sqlStmt ); |
| 228 | mbeanMethod = "runAdminQuery"; |
| 229 | p = (String) mbsInvoke(mbeanMethod, args, sigs); |
| 230 | return p.getProperty("sqlResults",null); |
| 231 | } |

CLIENT MANAGEMENT OF JAVA MANAGEMENT EXTENSIONS (JMX) MBEAN STATE

TECHNICAL FIELD

The present invention relates generally to techniques relating to computer programming objects and, more specifically, to a JMX Mbean programming object that is able to maintain state information for a client.

BACKGROUND OF THE INVENTION

For the past several decades, computers have become increasingly connected. Originally, computers were stand-alone devices, each typically designed and programmed for a specific task. Soon however, the advantages of combining computers into networks became apparent. Networks of computers were able to share resources such as printers and memory and eventually even able to share, or distribute, processing tasks. For example, a search of a large database can often be broken into multiple, mutually exclusive tasks by assigning different processors and/or computers to search different segments of the database.

As computers have become increasingly interconnected, techniques have been developed to enable multiple computers to work together. One such development is JAVA®, a high-level programming language originally developed by Sun Microsystems, Inc. of Mountain View, Calif. JAVA® enables programmers to develop code that is platform independent. Simply stated, code written in the JAVA® programming language is converted, or "interpreted," into actual computer instructions corresponding to a particular computer by a JAVA® Virtual Machine (JVM) that executes on the computer. In other words, by installing a JVM that corresponds to particular computer hardware and the associated operating system, a programmer can write code without regard to the particular hardware and operating system.

In addition to the increased connectivity of traditional computers, many devices that incorporate computing components have also become both inter-connected and JAVA®-enabled. Examples include Internet, or "web," telephones, cable boxes and televisions and application clients and servers. To facilitate the management of such JAVA®-enable resources, JAVA® Management Extensions (JMX) has been developed. JMX is a standard for managing and monitoring devices, applications and services in a JAVA environment. JMX defines a management architecture, design patterns, application programming interfaces (APIs), and services for building web-based, distributes, dynamic and modular solutions to manage JAVA® resources and programming objects.

JMX provides for the creation and implementation of JAVA® managed beans, or "Mbeans," which are programming objects that represent objects to be managed. Each Mbean has a management interface that enables a user or program to monitor, manage and be notified of changes to particular configuration parameters of a corresponding resource. For example, an Mbean representing an application may include attributes and methods corresponding to the application's cache size. In this example, reading a "cacheSize" attribute would return the application's cache size and writing a "cacheSize" attribute would update the size of the application's cache, thus changing the application's configuration.

Although the JMX specification has been updated to include invocation in a multi-user, distributed environment, a JMX Mbean is typically a singleton object. In other words, a specific Mbean accessed by multiple clients is not able to store state information corresponding to any particular invocation related to a specific client. Further, end users seeking to invoke a method of a JMX managed Mbean must do so via a JMX MbeanServer interface. This method of invocation requires several lines of JAVA® code to construct an argument list and an associate argument datatype list. What is needed is a method for employing a JMX Mbean that simplifies the construction of both the argument and datatype lists and enables the user to maintain state information so that multiple clients can access the same Mbean object without conflict.

SUMMARY OF THE INVENTION

Provided is a method for maintaining state information on a JMX Mbean programming object and simplifying the procedure for creating and employing the Mbean. In one embodiment, prior to invocation of a JMX Mbean, a JMX properties object is created. When the JMX Mbean is invoked, the properties object is passed to the JMX MbeanServer interface, which is responsible for the creating and managing the new Mbean object. Rather then constructing an argument list with multiple arguments, the properties object is the only argument employed in the Mbean invocation. Upon a successful invocation, the JMX MbeanServer interface returns an updated properties object, containing all the state information for the new Mbean object. The user then maintains the state information for the specific invocation. Each time the user make a call to JMX host via the Mbean object, the properties object is passed and, if necessary, updated. In this manner, the Mbean object created according to the disclosed technology is not necessarily a singleton object, but rather each Mbean is a distinct copy relating to the user's specific application. Further, the disclosed technology saves the JMX host the task of actively maintaining state information associated with a user' session and enables typographical errors that may be in an argument array to be detected prior to runtime.

In one embodiment, a structured query language (SQL) statement is passed to the JMX host as a string parameter in the properties object and the result of the corresponding query is passed back as a methods return value in an "sqlRresults" string parameter. Other coding strategies may be employed to handle non-string state parameters such as creating a custom class. This approach requires deploying the custom class with both the JMX Mbean and the client application. A service data object (SDO) works with the disclosed technology as well. One benefit of employing a SDO is that SDOs are able to handle classes within classes for a more robust property set than that provided by a JMX properties object.

This summary is not intended as a comprehensive description of the claimed subject matter but, rather, is intended to provide a brief overview of some of the functionality associated therewith. Other systems, methods, functionality, features and advantages of the invention will be or will become apparent to one with skill in the art upon examination of the following figures and detailed description.

BRIEF DESCRIPTION OF THE FIGURES

A better understanding of the present invention can be obtained when the following detailed description of the disclosed embodiments is considered in conjunction with the following figures, in which:

FIG. 3 is one example of a typical program listing to setup the management of a JAVA Mbean.

FIG. 4 is one example of a program listing to establish a properties memory object for managing an Mbean in accordance with the claimed subject matter.

FIG. 5 is an example of a program listing to invoke an Mbean in accordance with the claimed subject matter.

DETAILED DESCRIPTION OF THE FIGURES

Figure 1:
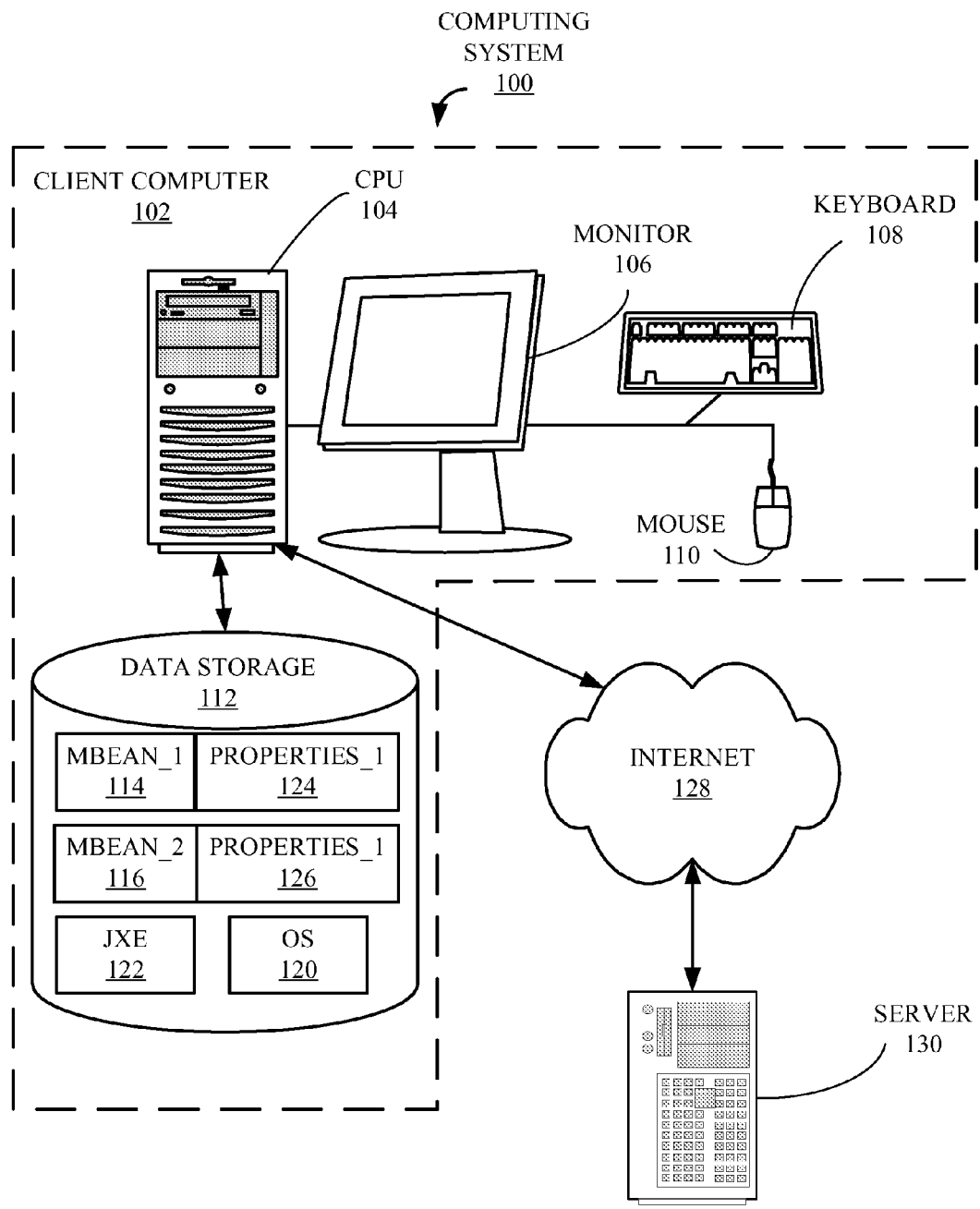
FIG. 1 is a block diagram of one example of a computing system that employs the claimed subject matter.

Although described with particular reference to the JAVA Management Extensions (JMX) standard, the claimed subject matter can be implemented in any information technology (IT) system in which access to programming objects by multiple users of applications is desirable. Those with skill in the computing arts will recognize that the disclosed embodiments have relevance to a wide variety of computing environments in addition to those described below. Further, although described with respect to JAVA management beans (MBeans) and the JAVA environment, the claimed subject matter also is applicable to modules, applications or any other type of interdependent computer logic. In other words, the disclosed technology is applicable to any situation in which there is interdependent computer code and a user or developer needs or wants to ensure that the computing environment is highly reliable.

In addition, the methods of the disclosed invention can be implemented in software, hardware, or a combination of software and hardware. The hardware portion can be implemented using specialized logic; the software portion can be stored in a memory and executed by a suitable instruction execution system such as a microprocessor, personal computer (PC) or mainframe.

In the context of this document, a "memory" or "recording medium" can be any means that contains, stores, communicates, propagates, or transports the program and/or data for use by or in conjunction with an instruction execution system, apparatus or device. Memory and recording medium can be, but are not limited to, an electronic, magnetic, optical, electromagnetic or semiconductor system, apparatus or device. Memory and recording medium also includes, but is not limited to, for example the following: a portable computer diskette, a random access memory (RAM), a read-only memory (ROM), an erasable programmable read-only memory (EPROM or flash memory), and a portable compact disk read-only memory or another suitable medium upon which a program and/or data may be stored.

One embodiment, in accordance with the claimed subject, is directed to a programmed method for simplifying and extending the usability of a JAVA MBean. The term "programmed method", as used herein, is defined to mean one or more process steps that are presently performed; or, alternatively, one or more process steps that are enabled to be performed at a future point in time. The term programmed method anticipates three alternative forms. First, a programmed method comprises presently performed process steps. Second, a programmed method comprises a computer-readable medium embodying computer instructions, which when executed by a computer performs one or more process steps. Finally, a programmed method comprises a computer system that has been programmed by software, hardware, firmware, or any combination thereof, to perform one or more process steps. It is to be understood that the term "programmed method" is not to be construed as simultaneously having more than one alternative form, but rather is to be construed in the truest sense of an alternative form wherein, at any given point in time, only one of the plurality of alternative forms is present.

Turning now to the figures, FIG. 1 is a block diagram of one example of a computing system architecture 100 that incorporates the claimed subject matter. Computing system 100 includes a client computer 102, which includes a central processing unit (CPU) 104, coupled to a monitor 106, a keyboard 108 and a mouse 110. Monitor 106, keyboard 108 and mouse 110 facilitate human interaction with computing system 100 and client computer 102. Attached to CPU 104 is a data storage component 112, which may either be incorporated into CPU 104, i.e. an internal device, or attached externally to CPU 104 by means of various, commonly available connection devices such as but not limited to, a universal serial bus (USB) port (not shown).

Data storage 112 is illustrated storing several exemplary Java Management bundles, or "Mbeans," including a first Mbean, or "Mbean_1," 114 and a second Mbean, or "Mbean_2," 116. It should be noted that a typical application or system may include many Mbeans, but for the sake of simplicity only two are shown. Also stored on data storage 112 are an operating system (OS) 120 and a JAVA execution engine (JXE) 122. Stored in conjunction with Mbean_1 114 and Mbean_2 116 are a properties_1 module 124 and properties_1 module 126, respectively. In the following description, Mbean_1 114, properties_1 module 124, Mbean_2 116 and properties_1 module 126 are JAVA Mbeans and corresponding property objects created and managed in accordance with the claimed subject matter. Properties_1 module 124 is employed in the creation and management of Mbean_1 114 and properties_1 module 126 is employed in the creation and management of Mbean_2 116. Properties_1 124 and properties_1 126 are the same type of object but are different instantiations, thus enabling Mbean_1 114 and Mbean_2 116 to each store their own state information. Mbean_1 114, Mbean_2 116, properties_1 124, properties_1 126, OS 120 and JXE 122 are described in more detail below in conjunction with FIGS. 2-8.

Client computer 102 is connected to the Internet 128, which is also connected to a server computer 130. Although in this example, client computer 102 and server 130 are communicatively coupled via the Internet 128, they could also be coupled through any number of communication mediums such as, but not limited to, a local area network (LAN) (not shown) and a direct wired connection.

Figure 2:
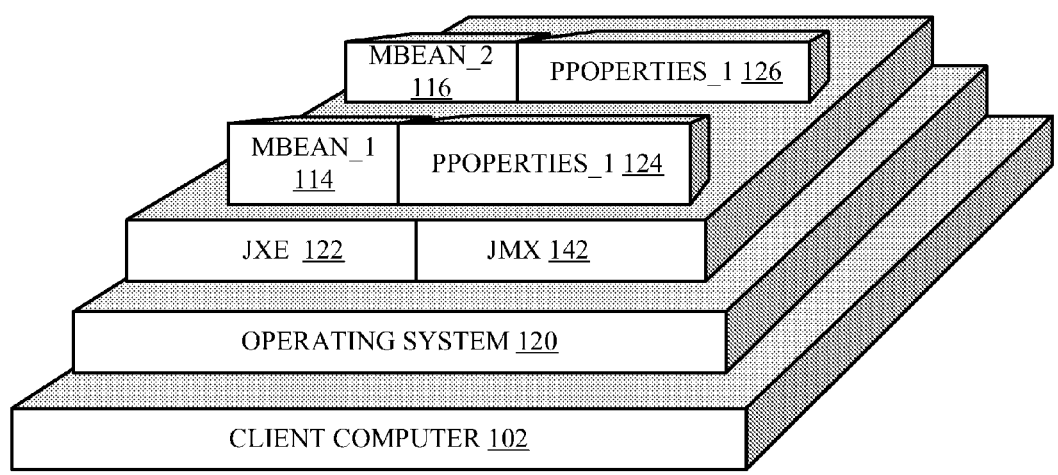
FIG. 2 is a block diagram of one example of a computer architecture that executes on a portion of the computing system of FIG. 1 and supports the techniques of the claimed subject matter.

FIG. 2 is a block diagram of computing system architecture 140 that executes on the computing platform, or hardware, represented by client computer 102 (FIG. 1). Other possible platforms include, but are not limited to, such computing platforms as server 130 (FIG. 1), television set top boxes, service gateways, cable modems, consumer electronic devices, personal computers (PCs), industrial computers and automobiles. OS 120 (FIG. 1) manages the resources of client computer 102. Examples of three OSs that support the claimed subject matter include Linux, MacIntosh and the various versions of Windows, all of which, as well as others, should be familiar to those with skill in the computing arts.

As mentioned above, in this example, OS 120 is supporting JXE 122 (FIG. 1) and JXE 122 implements the JAVA programming language, which is a product of Sun Microsystems, Inc. of Santa Clara, Calif. JXE 122 includes a Java runtime engine (JRE) (not shown) which executes Java programs, Java programs are compiled into byte codes which are interpreted by the JRE of JXE 122 rather then being compiled into native machine code. In this manner, a particular Java program can be written to execute on any hardware platform 102 and OS 120 that includes a corresponding JXE like JXE 122.

JXE 122 provides an execution environment for, among other things, Mbeans, which in this example include Mbean_1 114 (FIG. 1) and Mbean_2 116 (FIG. 1), which are managed by a JAVA Management Extension (JMX) 142, and corresponding properties objects, properties_1 124 and 126 (FIG. 1). In the following description, Mbeans 114 and 116 are used as examples of Mbeans that are managed by JMX 142 according to the claimed subject matter. Although Mbeans 114 and 116 are illustrated as residing on hardware platform 102, both of Mbeans 114 and 116 could be located on different platforms, e.g. stored in memory (not shown) associated with server 130 (FIG. 1) and executed on server 130.

FIG. 3 is one example of a typical program listing 150 to invoke an Mbean management method, including lines 151-175. In this example, a line 151 declares the method being invoked, entitled "runAdminQuery." Line 151 indicates that runAdminQuery is a public method that has a return value of data type "String." Line 152 declares an array, entitled "args," of type "Object" with eight (8) elements. Line 153 declares an array, entitled "sigs," of type "String" with eight (8) elements. Lines 154 and 155 allocate memory for the args and sigs arrays, respectively, that were declared in lines 152 and 153. Lines 156, 158, 160, 162, 164, 166, 168 and 170 declare data types associated with the array elements declared in line 152 and allocated in line 154. Lines 157, 159, 161, 163, 165, 167, 169 and 171 declare specific values associated with the array elements declared in line 153 and allocated in line 155. Line 172 declares the method that is being invoked, i.e. "runAdminQuery" and line 173 actually invokes the method. In this example, lines 152-171 are employed to set up the arguments for a call to the runAdminQuery method executed in line 173. Line 173 causes the return value of data type String to a method mbsInvoke method, which is handled by JMX 142 (FIG. 2), to be assigned to a variable entitled "sqlResults" of data type String. Line 174 causes method 150 to return the string result stored in sqlStrings variable in line 173. Finally, line 175 indicates the end of program listing 150.

One disadvantage of the calling structure exemplified by process 150 is the complexity of setting up the calling arguments. In this example, lines 152-171 are all used for this task and typically must be executed each time the method is invoked. Another disadvantage associated with program listing 150 is that there is no capability to store state information related to the calling process. The disclosed technology addresses these issues as explained in more detail below in conjunction with FIGS. 4-8.

FIG. 4 is one example of a program listing 200 to establish a properties memory object for managing an Mbean in accordance with the claimed subject matter, including lines 201-212. In this example, the mBean object is Mbean_1 114 (FIGS. 1 and 2) and the properties object is properties_1 124 (FIGS. 1 and 2). Line 201 includes the name of the defined class, i.e. "XYZZY." The particular name is arbitrary and used for illustrative purposes only. Line 202 defines and allocates space in memory for a properties object, such as properties_1 124. Within listing 200, the properties object is referred to as "p." Line 203 does not describe actual code but rather illustrates a place within module 200 where addition functions, or methods, may be defined. For the sake of simplicity, only one method is illustrated, i.e. a "makeConnection" method that is defined starting in line 204. Method makeConnection is a public function and does not return a parameter as indicated by the word "void" in front of the name. Lines 205-222 assign specific values to various fields within properties_1 124b by employing a "setProperty" method. In other words, each of line 205-211 specifies a particular field in properties_1124 and a value to assign to that particular field. For example, the value "jdbcDriver" is assigned to a jdbcDriver field, the value "jdbcType" is assigned to a jdbcType field, and so on. Finally, line 212 indicates the end of listing 200.

FIG. 5 is an example of a program listing 220 to invoke an Mbean in accordance with the claimed subject matter, including lines 221-231. Just as above in conjunction with FIG. 4, the mBean object is Mbean_1 114 (FIGS. 1 and 2) and the properties object is properties_1 124 (FIGS. 1 and 2). Line 221 includes the name of the defined method, i.e. "runAdminQuery." As described in line 221, method runAdminQuery 220 is a public function that takes a string variable entitles "sqlStmt" as an argument and returns a String variable, which in this case represents an response to a query stored in the sqlStmt argument.

In this example, rather than defining multiple arguments such as illustrated above in conjunction with listing 150 (FIG. 3) lines 152-171 (FIG. 3), method 220 defines an "args" array of type Object with one (1) element in line 222 and a "sigs" array of type String with one (1) element in line 223. Lines 225 and 226 then assign properties_1 124 (FIGS. 1 and 2) to the arrays declared in lines 222 and 223. Line 227 sets the value of the sqlStmt field of properties_1 124 to the values of the variable sqlStmt and line 228 sets the values of an mbeanMethod variable to "runAdminQuery." In this manner, lines 156-171 of listing 150 are eliminated from the listing and the call to mbsInvoke method represented by line 229 not only is made much simpler but it returns properties_124 with a result of the requested query and any state information relating to Mbean_1 114 associated with properties_1 124. Therefore, in addition to simplifying a JMX 142 (FIG. 2) call, the claimed subject matter enables a user to maintain state information on a particular Mbean such as Mbean_1 114 and Mbean_2 116.

Figure 6:
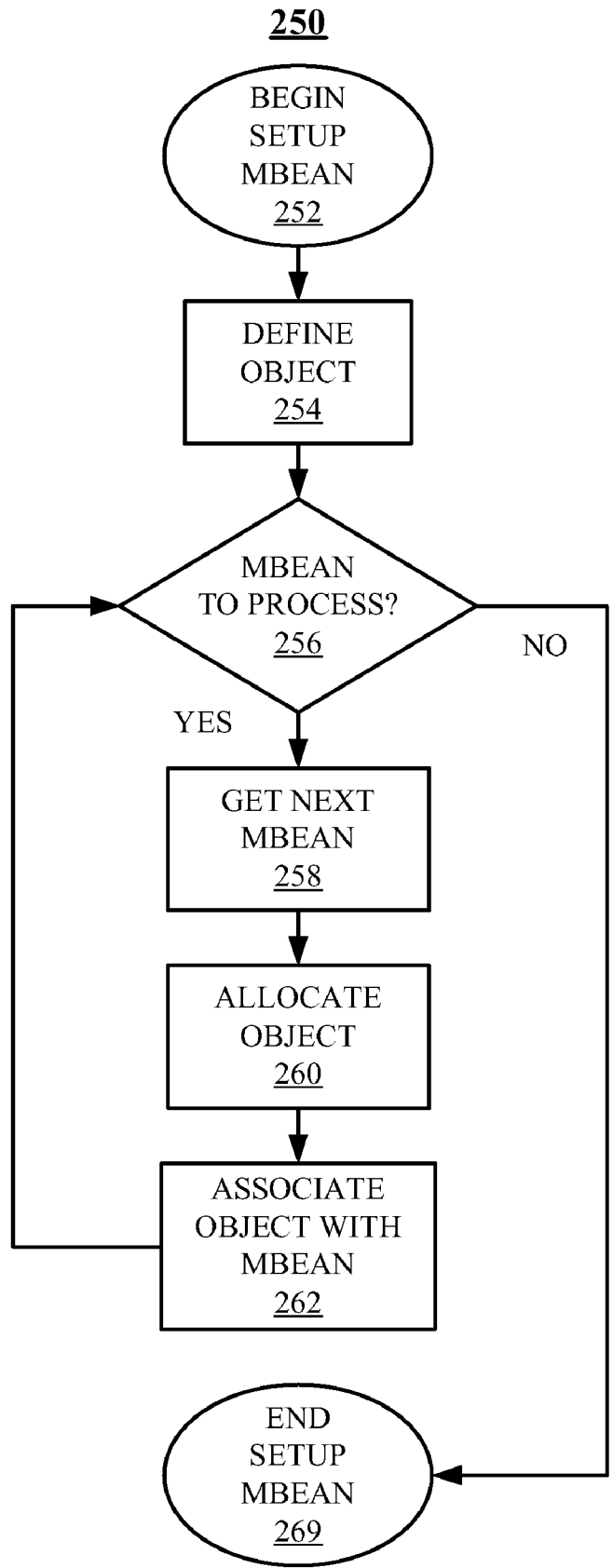
FIG. 6 is a flowchart of an Mbean setup process in accordance with the claimed subject matter.

FIG. 6 is a flowchart of an Mbean setup process 250 in accordance with the claimed subject matter. In this example, process 250 is stored on data storage 112 (FIG. 1) and executed on CPU 104 (FIG. 1) of client computer 102 (FIG. 1). As an example, the description of FIG. 6 describes setting up Mbean_1 114 and Mbean_2 116 in accordance with the claimed subject matter. Process 250 illustrates the setup of one type of Mbean but the process may be repeated if there are multiple types of Mbeans to be configured.

Process 250 starts in a "Begin Setup Mbean" block 252 and proceeds immediately to a "Define Object" block 254. During block 254, process 250 defines a data object for storing information relating to a particular type of Mbean such as Mbean_1 114 and Mbean_2 116. The particular configuration of the object depends upon the function and state information associated with the Mbeans corresponding to the objects. In this example, the defined object is an object such as properties_124 and 126 (FIGS. 1 and 2). During an "Mbean to Process?" block 256, process 250 determines whether or not there are any Mbeans that need processing in accordance with the claimed subject matter. In this example, Mbeans 114 and 116 are such Mbeans and, during the first iteration of process 250 both need to be processed.

During a "Get Next Mbean" block 258, process 250 selects the first unprocessed Mbean, which during the first iteration in this example is Mbean_1 114. During an "Allocate Object" block 260, process 250 allocates space in memory for an object of the type defined during block 254, which in this example is proerties_1 124. During an "Associate Object With Mbean" block 262, process 250 populates the object with information corresponding to the current Mbean. As explained above in conjunction with FIG. 1, properties_1 124 and properties_1 126 are the same type of object but are different instantiations, in which each instantiation holds information relating to the respective Mbean, i.e. Mbean_1 114 and Mbean_2 116.

Once a properties object has been associated with an Mbean during block 262, process 250 returns to Mbean to Process block 256 and processing continues as described above. In this example, the second time through the iterations of blocks 256, 258, 260 and 262 process 250 selects Mbean_2 116 and allocates memory for properties_1 126. If during block 256 process 250 determines that there are no more Mbeans to process, control proceeds to an "End Setup Mbean" block 269 in which process 250 is complete.

Figure 7:
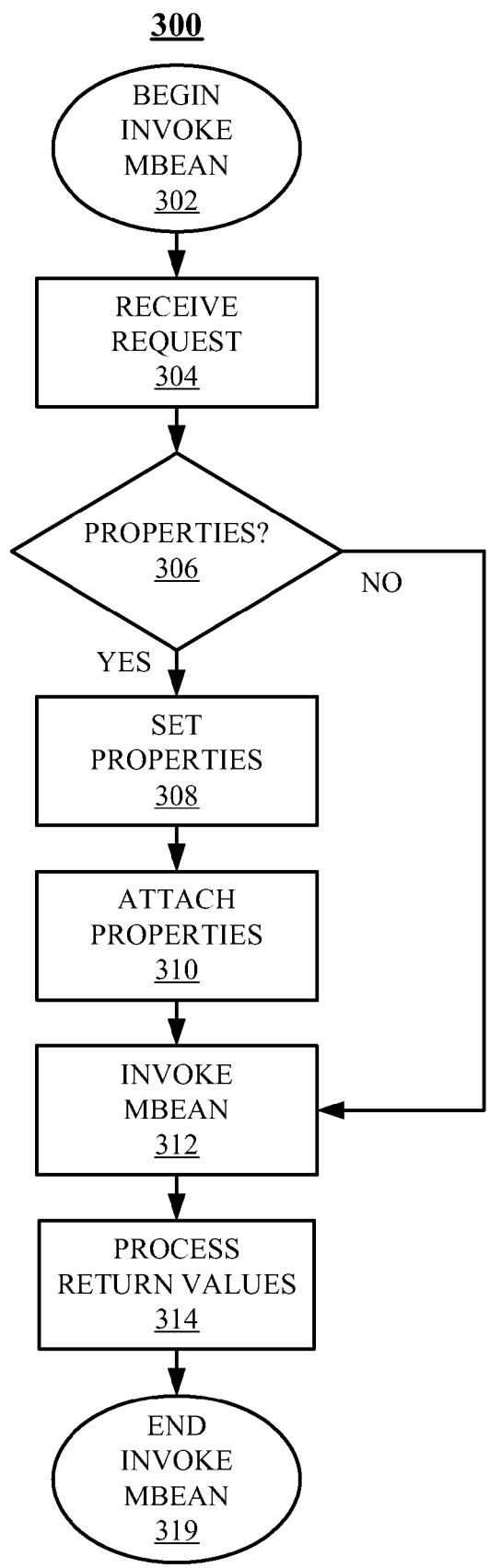
FIG. 7 is a flowchart of an Mbean Invoke process in accordance with the claimed subject matter.

FIG. 7 is a flowchart of an Mbean Invoke process 300 in accordance with the claimed subject matter. Like process 250 in FIG. 6, process 300 is stored on data storage 112 (FIG. 1) and executed on CPU 104 (FIG. 1) of client computer 102 (FIG. 1). As an example, the description of FIG. 7 describes the invocation of Mbean_1 114 in accordance with the claimed subject matter.

Process 300 starts in a "Begin Invoke Mbean" block 302 and proceeds immediately to a "Receive Request" block 304. During block 304, JXE 122 (FIGS. 1 and 2) a user or application requests the services of a particular Mbean, e.g. Mbean_1 114. During a "Properties?" block 306, process 300 determines whether or not the particular Mbean is one in which the claimed subject matter is applicable, i.e. the mbean is stored in association with a properties object. If so, control proceeds to a "Set Properties" block 308 during which the properties object associated with the target Mbean during block 262 (FIG. 6) is populated with any information relevant to the specific invocation during the current processing.

During an "Attach Properties" block 310, process 300 attaches the properties object to the target Mbean, i.e. properties_1 114 is attached to Mbean_1 114. Once properties_1 124 is attached to Mbean 114, or if during block 306 process 300 has determined that the target Mbean does not include a properties object, control proceeds to an "Invoke Mbean" block 312. During block 312, the Mbean is invoked with or without an attached properties object depending upon whether control has proceeded form block 310 or 306, respectively. During a "Process Return Values" block 314, the result of the processing by JMX 142 (FIG. 2) of Mbean_1 is returned to process 300 and the appropriate actions are taken to process the information returned. Finally, process 300 proceeds to an "End Invoke Mbean" block 319 in which process 300 is complete.

While the invention has been shown and described with reference to particular embodiments thereof, it will be understood by those skilled in the art that the foregoing and other changes in form and detail may be made therein without departing from the spirit and scope of the invention, including but not limited to additional, less or modified elements and/or additional, less or modified blocks performed in the same or a different order.

I claim:

1. A method for maintaining state information in a client processing object, comprising:
defining a state information data object corresponding to a JAVA Mbean;
allocating memory for an instantiation of the state information data object;
populating the instantiation with information concerning a state of the JAVA Mbean;
passing the JAVA Mbean and the instantiation to a Java Management Extension (JMX) host; and
processing an updated version of the instantiation as a return value from the JMX host.

2. The method of claim 1, further comprising:
generating a database query;
incorporating the database query in the instantiation; and
returning a database response corresponding to the updated instantiation.

3. The method of claim 2, wherein the database query is in a structured query language (SQL) format.

4. The method of claim 1, wherein the state information data object is a properties object.

5. The method of claim 1, wherein the state information data object is a service data object (SDO).

6. The method of claim 1, wherein the state information data object is a custom data object including non-string type parameters.

7. The method of claim 1, further comprising:
allocating memory for a second instantiation of the state information data object;
populating the second instantiation with information concerning a state of a second JAVA Mbean;
passing the second JAVA Mbean and the second instantiation of the JMX host; and
processing a second updated instantiation of the second instantiation as a second return value from the JMX host.

8. A system for maintaining state information in a client processing object, comprising:
a processor;
a non-transitory computer-readable memory;
a definition of state information data object corresponding to a JAVA Mbean;
an instantiation of the state information data object based upon the definition;
information corresponding to a state of the JAVA Mbean for populating the instantiation;
logic, stored on the computer-readable memory and executed on the processor, for:
passing the JAVA Mbean and the instantiation populated with the information to a Java Management Extension (JMX) host; and
processing an updated version of the instantiation as a return value from the JMX host corresponding to an updated version of the instantiation.

9. The system of claim 8, further comprising:
a database query statement;
logic for incorporating the database query into the instantiation; and
a database response corresponding to the database query statement incorporated into the updated instantiation.

10. The system of claim 9, wherein the database query statement is in a structured query language (SQL) format.

11. The system of claim 8, wherein the definition of the state information data object defines a properties object.

12. The system of claim 8, wherein the definition of the state information data object defines a service data object (SDO).

13. The system of claim 8, wherein the definition of the state information data object defines a custom data object comprising non-string type parameters.

14. The system of claim 8, further comprising:
a second instantiation of the state information data object based upon the definition;
information corresponding to a state of the second JAVA Mbean for populating the second instantiation;
logic for passing the second JAVA Mbean and the second instantiation to the JMX host; and
a second return value from the JMX host corresponding to a second updated version of the second instantiation.

15. A computer programming product for maintaining state information in a client processing object, comprising:
a non-transitory computer-readable memory;
a definition of a state information data object corresponding to a JAVA Mbean stored on the memory;
logic, stored on the memory for execution on a processor, for allocating memory for an instantiation of the state information data object;
logic, stored on the memory for execution on the processor, for populating the instantiation with information concerning a state of the JAVA Mbean;
logic, stored on the memory for execution on the processor, for passing the JAVA Mbean and the instantiation to a Java Management Extension (JMX) host; and
logic, stored on the memory for execution on the processor, for processing an updated version of the instantiation as a return value from the JMX host.

16. The computer programming product of claim 15, further comprising:
logic, stored on the memory for execution on the processor, for generating a database query;
logic, stored on the memory for execution on the processor, for incorporating the database query in the instantiation; and
logic, stored on the memory for execution on the processor, for returning a database response corresponding to the updated instantiation.

17. The computer programming product of claim 16, wherein the database query is in a structured query language (SQL) format.

18. The computer programming product of claim 15, wherein the state information data object is a properties object.

19. The computer programming product of claim 15, wherein the state information data object is a service data object (SDO).

20. The computer programming product of claim 15, wherein the state information data object is a custom data object including non-string type parameters.

* * * * *